July 13, 1965 W. SCHLÜETER 3,194,617
BEARING ASSEMBLY
Filed Dec. 18, 1962 2 Sheets-Sheet 1

Inventor:
Wilhelm Schlüter
by Michael S. Striker
Atty

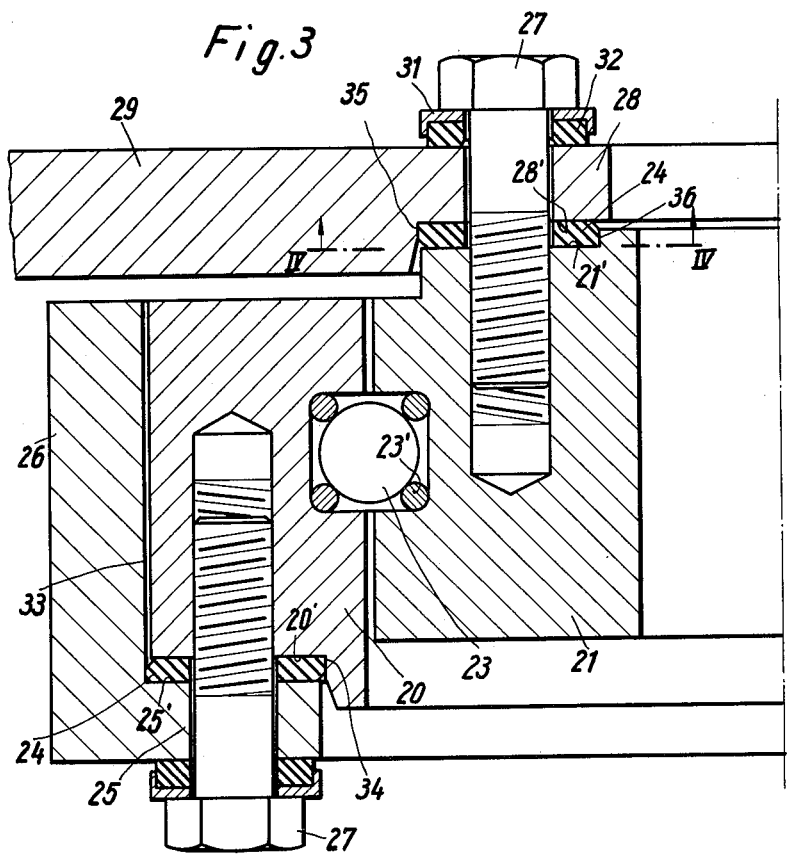
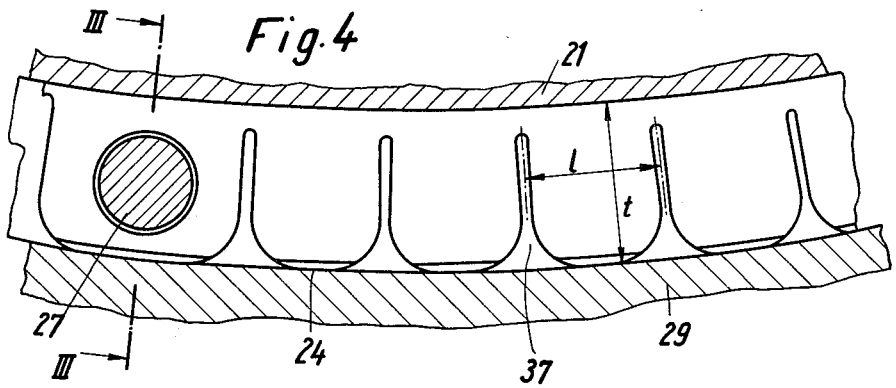

United States Patent Office 3,194,617
Patented July 13, 1965

3,194,617
BEARING ASSEMBLY
Wilhelm Schlüeter, Dortmund, Germany, assignor to Eisenwerk Rothe Erde G.m.b.H., Dortmund, Germany
Filed Dec. 18, 1962, Ser. No. 245,617
Claims priority, application Germany, Dec. 23, 1961, E 22,164
6 Claims. (Cl. 308—219)

The present invention relates to bearings.

More particularly, the present invention relates to anti-friction bearings of large diameter in which a pair of race rings with rolling means therebetween are respectively supported by a pair of supporting rings which are arranged with respect to the race or bearing rings to take up also axial forces the anti-friction bearing may be subjected to. In such bearing assemblies the supporting rings and the race rings may be made from different materials, having different coefficients of expansion for instance the supporting rings may be made from steel, whereas the race rings may be made from light metal alloys, such as aluminum alloys. The supporting rings and race rings of such a bearing assembly will expand radially to a different extent during temperature changes occurring during operation of the bearing assembly, whereby the rings in bearing assemblies according to the prior art will make a sliding movement relative to each other. If the bearing assembly is subjected to axial forces it is sometimes difficult to maintain in this case the rings coaxial with each other.

It is an objective of the present invention to provide for a bearing assembly of the mentioned type, in which the above mentioned disadvantage of such bearing assemblies known in the prior art are avoided.

It is a further object of the present invention to provide for a bearing assembly of the mentioned type in which also axial forces can be taken up without causing substantial sliding movement of the faces of the rings of the assembly which extend abutting against each other transverse to the bearing axis.

It is an additional object of the present invention to provide for a bearing assembly of the mentioned type in which during differential expansion and contraction of the rings a resilient force is created tending to keep the rings of the bearing assembly coaxial with each other.

It is yet an additional object of the present invention to provide for a bearing assembly of the mentioned type which is constructed of relative few and simple parts so that the assembly will stand up under extended use.

With these objects in view, the bearing assembly of the present invention includes a supporting ring, a bearing ring arranged coaxially with and substantially non-rotatably relative to said supporting ring, in which one of said rings has a supporting surface extending transverse to the bearing axis and the other of said rings has a portion spaced from and facing said supporting surface. The bearing assembly includes further resiliently deformable means between said supporting surface of said one and said portion of said other ring for transmitting axial forces between said rings and the resiliently deformable means extending in axial direction and have an end surface abutting against said supporting surface. Said resiliently deformable means being resiliently deformed in direction transverse to said axis during differential expansion or contraction of said rings so as to exert a resilient force tending to keep said rings coaxial with each other while permitting such expansion without any substantially sliding movement of said surfaces with respect to each other.

The resilient deformable means may be formed by forming in one of the rings for instance into the race ring of an anti-friction bearing assembly an annular groove extending in axial direction from an end surface thereof facing the supporting surface of the supporting ring and dividing a portion of the race ring adjacent said supporting surface into a narrow annular portion and in a wide annular portion and in which the wide annular portion has an end face spaced from and facing the supporting surface, while the narrow annular portion is formed with a plurality of radially extending slits extending angularly spaced from each other therethrough and in which the free end surface of the narrow annular portion abuts against the supporting surface so as to transmit axial forces between the rings. In this arrangement the narrow annular portion is resiliently deformed in direction transverse to the axis during differential expansion of the rings of the bearing assembly so as to create a resilient force tending to keep the rings coaxial with each other, while permitting such expansion without any substantially sliding movement of said abutting surfaces with respect to each other.

On the other hand, the resiliently deformable means may also be formed by a ring made from resiliently deformable material sandwiched between and abutting with opposite end surfaces thereof against corresponding end surfaces of supporting and race rings. In this arrangement the thickness of the ring sandwiched between supporting ring and race ring has to be made such to permit resilient deformation of the resiliently deformable ring in a direction transverse to the bearing axis and shifting of the end faces of the ring relative to each other in transverse direction during differential expansion of supporting ring and race ring so as to create during such expansion a resilient force tending to keep the last mentioned rings coaxial to each other, while permitting such expansion without any substantial sliding movement of the abutting surfaces relative to each other. The resiliently deformable ring is preferably made with rectangular cross section which is deformed during different expansion of supporting and race rings to a cross section having the outline of a parallelogram.

Preferably the resiliently deformable ring is also formed with a plurality of angularly spaced slits extending in radial direction from the outer surface toward but short of the inner surface of this ring.

In both cases the supporting ring and/or the race ring is preferably formed with a peripheral surface extending coaxial with the bearing axis in axial direction and the resiliently deformable means is formed with at least one peripheral surface portion abutting against at least one of the aforementioned peripheral surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a partial axial cross section of another embodiment of a bearing assembly according to the present invention, the section being taken along the line III—III of FIG. 4; and FIG. 4 is a partial cross section taken along the line IV—IV of FIG. 3.

Figure 1:
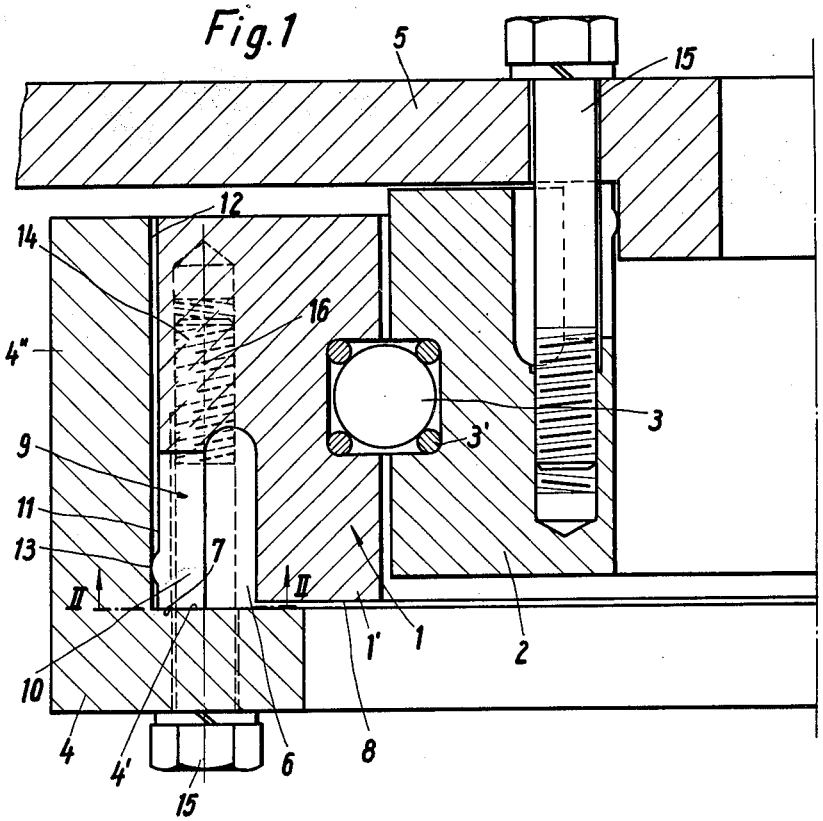
FIG. 1 is a partial longitudinal cross section through a bearing assembly according to the present invention, the cross section being taken along the line I—I of FIG. 2.
Figure 2:
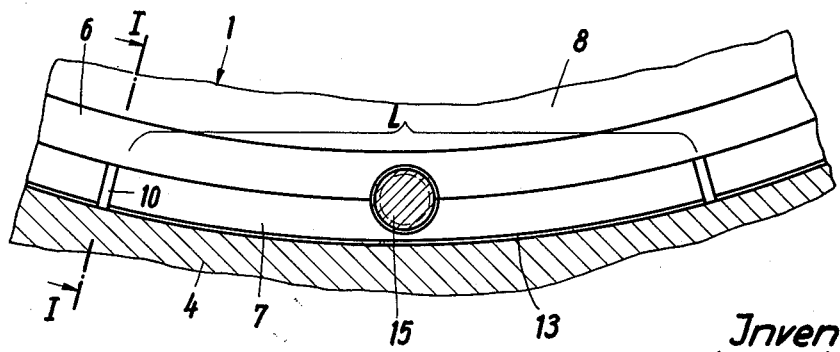
FIG. 2 is a partial cross section of the embodiment shown in FIG. 1, and taken along the line II—II of FIG. 1.

Referring now to the drawings and more specifically to FIGS. 1 and 2 of the same, it will be seen that the bearing assembly shown in these two figures includes a pair of race rings 1 and 2 which are preferably made from light metal alloys, such as aluminum alloys and which are formed in facing annular surface portions thereof with grooves in which the rolling elements, shown in FIG. 1 as balls 3, of the anti-friction bearing are located. When the race rings 1 and 2 are made from light metal alloy as mentioned above, the balls 3 do not abut directly against the surfaces of the grooves formed in the rings but four steel wire rings 3' respectively located at corner portions of the rectangular grooves are sandwiched between the balls 3 and the groove surfaces, so that the balls 3 roll on the inner surface of the wire rings 3'. The race ring 1 is mounted in a supporting ring 4 and the race ring 2 in a supporting ring 5, which supporting rings are preferably made from steel. The supporting ring 4 has a supporting surface 4' extending substantially normal to the axis of the bearing and the race ring 1 is formed with an annular groove 6 extending in axial direction from an end surface thereof facing the supporting surface 4' and dividing a portion of the race ring 1 adjacent the supporting surface 4' into a narrow annular portion 9 and a wide annular portion 1'. The wide annular portion 1' has an end face 8 facing the supporting surface 4' spaced therefrom, whereas the narrow annular portion 9 is formed with a plurality of radially extending slits 10 extending angularly spaced from each other a distance L (FIG. 2) therethrough and the narrow annular portion 9 has an end surface 7 abutting against the supporting surface 4' so as to transmit axial forces between race ring 1 and the supporting ring 4. The supporting ring 4 has an outer annular flange 4" extending in axial direction of the bearing and coaxial with the bearing axis and the narrow annular portion 9 of the race ring 1 is formed at the outer peripheral surface 11 facing and closely adjacent the inner surface 12 of the flange 4" with a convexly curved annular bead 13 arranged adjacent the free end of the narrow annular portion 9 of the race ring 1 and abutting against the inner surface 12 of the flange 4". The race ring 2 is formed and arranged with respect to the supporting ring 5 in a similar manner as described above in connection with race ring 1 and supporting ring 4 so that a detailed description of the relative arrangement of race ring 2 and supporting ring 5, which is clearly shown in FIG. 1, seems superfluous.

During differential expansion of the race rings and the supporting rings during operation of the bearing assembly, the narrow annular portion 9 of the race ring 1, respectively the sections formed in this narrow annular portion by the slits 10, and the corresponding portions of the race ring 2 will be resiliently deformed in a direction transverse to the bearing axis while the bead 13 on the race ring 1 and the corresponding bead on the race ring 2 will stay in engagement with the corresponding surfaces on the flanges of the supporting rings. During such resilient deformation of the narrow annular portions of the race rings, resilient forces will be created therein tending to keep the race rings 1 and 2 coaxial with each other and coaxial with respect to the supporting rings 4 and 5. The narrow annular portion 9 of the race ring 1 and the corresponding annular portion of the race ring 2, while being deformable in direction transverse to the bearing axis during differential heat expansion and contraction of race and supporting rings have to be strong enough to properly transmit any axial forces the bearing assembly may be subjected to between race rings and supporting rings. It should be noted that during differential expansion and contraction of race rings and supporting rings the abutting surfaces 4' and 7 of race ring 1 and supporting ring 4 and the abutting corresponding surfaces on race ring 2 and supporting rings 5 will not slide relative to each other. The race ring 1 is formed adjacent the outer peripheral surface 11 with a tapped bore 14 extending in axial direction and race ring 2 is formed adjacent the inner peripheral surface thereof with a corresponding tapped bore, while the supporting rings 4 and 5 are formed with bores respectively aligned with the tapped bores formed in race rings 1 and 2. Extending through the aligned bores are screws 15 for fastening the respective race ring to the corresponding supporting ring. Screws 15 have axes 16 preferably located within the end surface 7 of the race ring 1 or the corresponding end surface of the race ring 2 so that the end surfaces of the race rings are pressed with great force against the corresponding supporting surfaces of the supporting rings whereby the screws 15 are subject to practically no torsional forces. During differential heat expansion of the rings the screws 15 may also be slightly deformed in direction transverse to the axis so as to create therein also resilient forces likewise tending to maintain the rings coaxial with each other.

The narrow annular portion 9 of the race ring 1 and the corresponding narrow annular portion of the race ring 2 form, therefore, resiliently deformable means between support rings and race rings for transmitting axial forces between the rings and the resiliently deformable means being resiliently deformed in direction transverse to the bearing axis during differential expansion or contraction of the rings so as to exert a resilient force tending to keep the rings coaxial with each other while permitting such expansion or contraction without any substantial sliding movement of the abutting transverse surfaces of the rings with respect to each other.

It will be understood that each of the elements described above, or two or more together, may also find a useful application in other types of bearing assemblies differing from the types described above.

While the invention has been illustrated and described as embodied in anti-friction bearing assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an anti-friction bearing assembly, in combination, a supporting ring having a supporting surface extending transverse to the bearing axis; a race ring arranged coaxially with and substantially non-rotatably relative to said supporting ring and having a portion spaced from and facing said supporting surface; and resiliently deformable means integral with said portion of said race ring extending therefrom in axial direction and having an end surface abutting against said supporting surface for transmitting axial forces between said rings, said resiliently deformable means being resiliently deformed in direction transverse to said axis during differential expansion of said rings so as to exert a resilient force tending to keep said rings coaxial with each other while minimizing during such expansion the sliding movement of said surfaces with respect to each other.

2. In an anti-friction bearing assembly, in combination, a supporting ring having a supporting surface extending transverse to the bearing axis; a race ring arranged coaxially with and substantially non-rotatably relative to said supporting ring, said race ring being formed with an annular groove extending in axial direction from an end surface thereof facing said supporting surface and dividing a portion of said race ring adjacent said supporting surface into a narrow annular portion and a wide annular portion, said wide annular portion having an end face spaced from and facing said supporting surface, said narrow annular portion being formed with a plurality of radial slits extending angularly spaced from each other therethrough and said narrow annular portion having an end surface abutting against said supporting surface so as to transmit axial forces between said rings, said narrow annular portion being resiliently deformed in direction transverse to said axis during differential expansion of said rings so as to exert a resilient force tending to keep said rings coaxial with each other while minimizing during such expansion the sliding movement of said surfaces with respect to each other.

3. In an anti-friction bearing assembly as set forth in claim 2 in which said supporting ring is formed with an annular flange extending transverse to said supporting surface adjacent to but radially spaced from said narrow portion of said race ring, and in which said narrow portion is formed at a peripheral surface adjacent to said flange with an annular bead abutting against said flange.

4. In an anti-friction bearing assembly as set forth in claim 3 in which said annular bead is formed adjacent the free end of said narrow annular portion.

5. In an anti-friction bearing assembly as set forth in claim 3 and including a plurality of screws extending in axial direction angularly spaced from each other adjacent said peripheral surface of said race ring through said supporting ring into said race ring to fasten said rings to each other.

6. In a bearing assembly as set forth in claim 1 in which said rings are made from different materials having respectively different coefficients of expansion.

References Cited by the Examiner
UNITED STATES PATENTS

| | | | |
|---|---|---|---|
| 2,530,323 | 11/50 | Boyd | 308—184 |
| 2,551,621 | 5/51 | Michelsen | 308—184 X |
| 2,785,934 | 3/57 | Alderstam | 308—235 X |
| 3,002,429 | 10/61 | Franke | 308—230 X |

FOREIGN PATENTS 1,041,307  10/58  Germany.

ROBERT C. RIORDON, *Primary Examiner.*

FRANK SUSKO, *Examiner.*